AID FOR BLIND SWITCHBOARD ATTENDANT

Filed July 20, 1962

INVENTOR
R. F. SCHUYLER
BY Sylvan Sherman
ATTORNEY

Feb. 8, 1966 R. F. SCHUYLER 3,234,337

AID FOR BLIND SWITCHBOARD ATTENDANT

Filed July 20, 1962 2 Sheets-Sheet 2

INVENTOR
R. F. SCHUYLER
BY Lyman Sherman
ATTORNEY

United States Patent Office 3,234,337
Patented Feb. 8, 1966

3,234,337
AID FOR BLIND SWITCHBOARD ATTENDANT

Robert F. Schuyler, Long Island City, N.Y., assignor to Bell Telephone Laboratories, Incorporated, New York, N.Y., a corporation of New York Filed July 20, 1962, Ser. No. 211,272
5 Claims. (Cl. 179—91)

This invention relates to a manual telephone switchboard and more particularly to audio aids for blind switchboard attendants.

It has long been recognized that many blind persons, due to their acutely developed senses of hearing and touch, are ideally suited to act as switchboard attendants. It is obvious, however, that certain modifications are necessary in the usual manual switchboard designed for use by attendants with normal sight.

In one type of modified switchboard described in the copending application of H. R. Banks and C. Nickerson, Serial No. 74,421, filed December 7, 1960, now U.S. Patent No. 3,057,965, a braille unit is used in association with a manual telephone switchboard. The braille unit is designed to indicate to the attendant by "touch" the nature of the service required and the number of the cord, trunk or station involved. Corresponding braille figures on the switchboard indicate to the attendant where to plug in to complete the call.

In an alternate arrangement lights are arranged vertically along a side of the switchboard. When an incoming call is received, the attendant scans vertically with a light sensitive indicator until an indication is received identifying the row in which the calling line is located. The attendant then scans horizontally along the indicated row of line lamps until the lighted call lamp is located. The call is then completed.

Each of the above-described arrangements requires modifications to the standard switchboard which are costly and which limit the number of facilities available for blind attendant use. In addition, each of the arrangements requires two or more scanning operations in order to complete a call.

It is, therefore, the object of this invention to provide a simpler, quicker, and more convenient method of completing calls by blind switchboard attendants and to reduce the costs of equipment needed to adapt standard switchboard equipment for blind attendant use.

In accordance with the invention, a multiplicity of audio generators, each capable of generating a distinctly different tone, is used in conjunction with the standard switchboard. The different tones correspond to the different rows on the switchboard. When an incoming call is received on one of the incoming lines, a tone is heard in the attendant's headset which corresponds to the particular row in which the calling line is located. The operator then scans the indicated row directly with a light-sensitive probe until the lighted call lamp associated with the calling line is reached as indicated by a second tone in the attendant's headset. The call can then be completed.

It is an advantage of the invention that the tone generators provide immediate row information to the attendant thus eliminating the need to modify the standard switchboard in order to provide row lights for the attendant to scan. In addition, the time spent scanning is reduced, thereby permitting more rapid service.

When more than one call is received at a time, the operator discerns the fundamental of the lowest tone produced and scans the corresponding row. When that particular call is completed, the next row corresponding to the next higher tone is scanned and the process repeated as many times as necessary until all the calls are completed.

These and other objects and advantages, the nature of the present invention, and its various features, will appear more fully upon consideration of the various illustrative embodiments now to be described in detail in connection with the accompanying drawings, in which.

Figure 1:
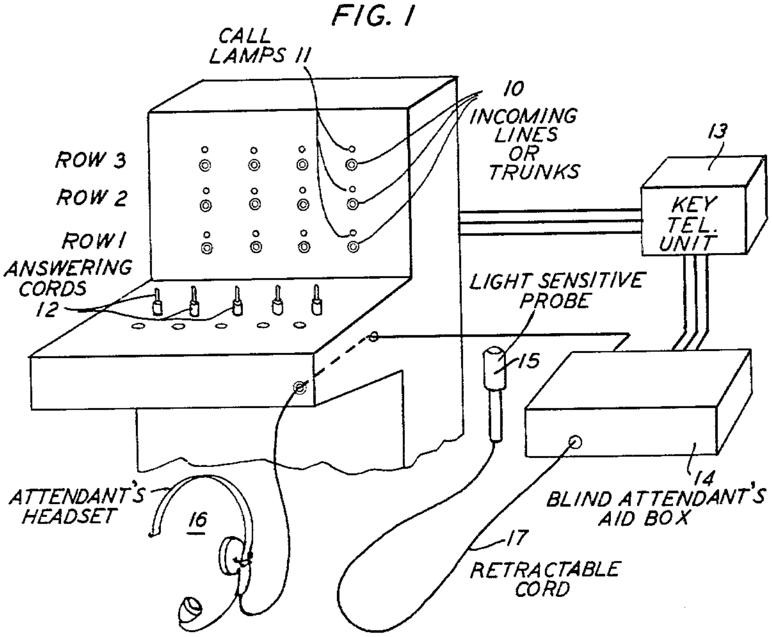
FIG. 1 shows a standard switchboard adapted for use by a blind attendant.

Referring to FIG. 1, there is shown a portion of a typical manual switchboard containing 12 incoming trunks or lines 10 arranged in three horizontal rows of four each. For purposes of identification, the bottom row is designated row 1; the middle row is designated row 2, and the upper row is designated row 3. Each of the individual lines has associated with it a call lamp 11 which lights when an incoming call is received on the line. Also shown are five answering cords 12, a key telephone unit 13, the blind attendant's aid box 14 and probe 15 (details of which will be explained in greater detail hereinbelow) and the attendant's headset 16.

As explained above, means are provided to enable a blind attendant to quickly locate a calling line (or trunk). This is done in two steps. First the attendant identifies the row in which the calling line is situated by a tone heard in her headset. Second, using a light sensitive probe, the call lamps in the indicated row are scanned until a second, distinctly different tone of greater intensity is heard. The second tone is superimposed upon the row-identifying tone when the light-sensitive probe is exposed to a lighted call lamp. The call is then completed.

Figure 2:
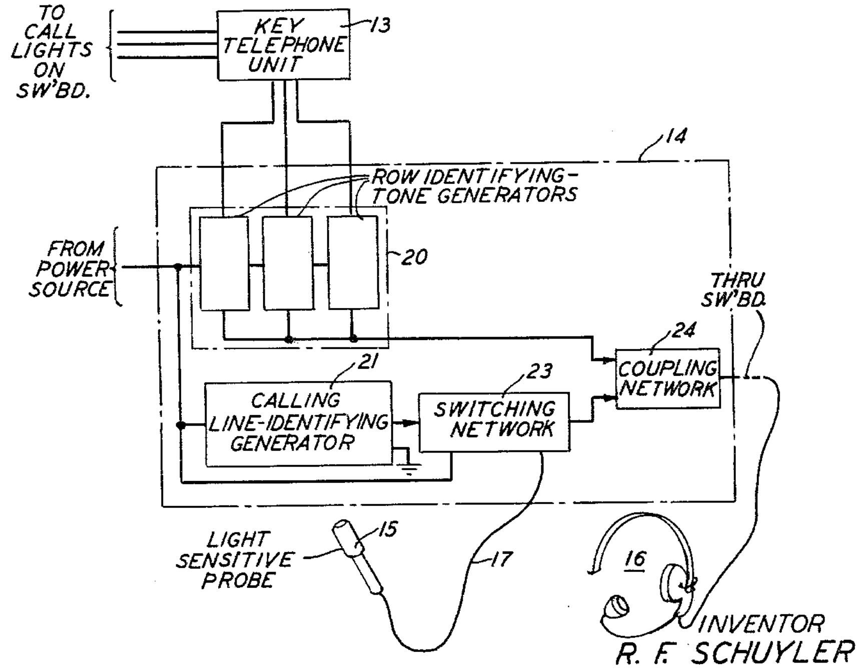
FIG. 2 shows, in block diagram, the blind attendant aid box.

The blind attendant's aid box 14 typically contains, as shown in the block diagram of FIG. 2, a multiplicity of row-identifying tone generators 20, equal in number to the number of rows on the switchboard, a calling line-identifying signal generator 21 of fixed frequency, the light-sensitive probe 15 and associated switching network 23 and a coupling network 24 for coupling the row-identifying tones and the calling line-identifying signal to the attendant's headset 16. Power (from a power source not shown) is also shown connected to the various generators and networks as required.

There is also shown in FIG. 2 the key telephone unit 13 which is connected to the various call lights 11 and which activates the corresponding row-identifying tone generator when a call light is lit.

Figures 3, 4:
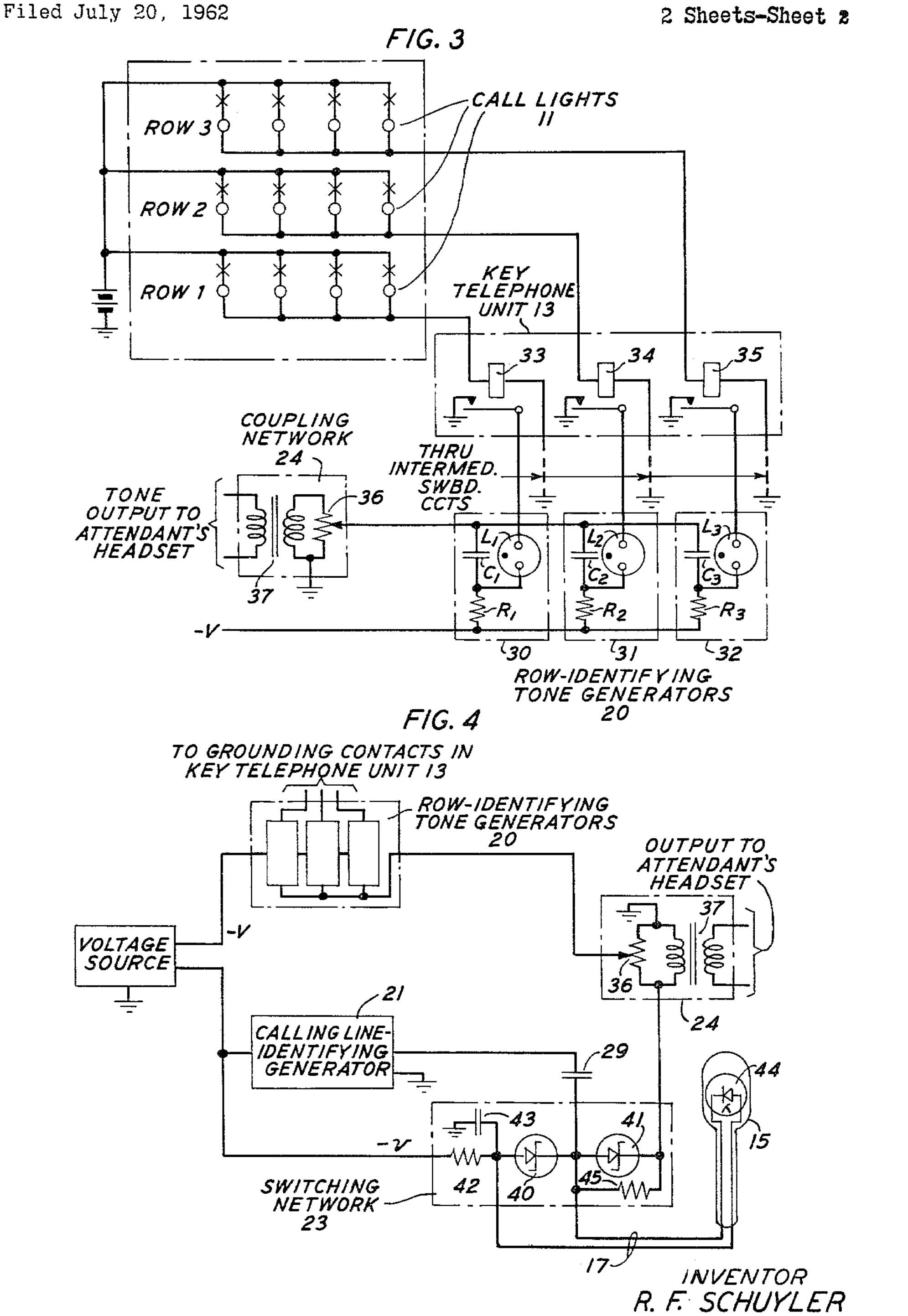
FIG. 3 shows a circuit diagram of the row-identifying tone generators and the keyed telephone unit.
FIG. 4 shows a circuit diagram of the switching network and the various connections thereto.

In FIG. 3, illustrative embodiments of the row-identifying tone generators 20 and the key telephone unit 13 are shown in greater detail. In the embodiment of FIG. 3, the row-identifying tone generators comprise three well-known gas relaxation oscillators 30, 31, and 32, each of which produces a sawtooth voltage containing a high degree of harmonics. As illustrated, each generator comprises a neon glow lamp, such as lamp $L_1$, and an associated resistance-capacitance combination $R_1$ and $C_1$. Each of the three tone generators, which are paralleled across a negative voltage power supply —V of approximately −110 volts, is activated by grounding a terminal of the neon lamp in response to an incoming call. Grounding is accomplished in the key telephone unit 13 by one of the relays 33, 34, or 35, which are located in the return paths of each row of call lights. Thus, for example, if any one of the call lights in row 1 on the switchboard is lighted in response to an incoming call, relay 33 is activated, grounding lamp $L_1$ and causing generator 30 to oscillate. Similarly a lighted call lamp in row 2 or row 3, will activate relay 34 or 35 and cause generator 31 or 32 to oscillate. The resulting tones are coupled to the attendant's headset 16 through potentiometer 36 and output transformer 37 of coupling network 24.

While only three tone generators are shown in FIGS. 2 and 3, it is understood that additional generators can be added as required as more rows are added to the switchboard.

Having identified the particular row in which the incoming call is located from the tone audible in the headset, the attendant then scans the indicated row seeking the calling line. Scanning is done with a light-sensitive probe 15 attached to the end of a retractable cord 17, as shown in FIG. 1. Typically, the scanning probe 15 contains a light-sensitive element, such as a photo diode, which, in conjunction with additional associated circuitry, acts as a switch. In the presence of a lighted call light an additional signal, the so-called "calling line-identifying signal," is superimposed upon the row-identifying tone thereby informing the attendant that the calling line has been located. The attendant then completes the call by inserting one of the answering cords 12 into the calling line.

FIG. 4 shows details of the light-sensitive probe 15 and switching network 23 connected, in accordance with the invention, to the calling line-identifying generator 21 and coupling network 24. As shown, the output from generator 21 is coupled through a capacitor 29 to the switching circuit 23. The switching circuit comprises a pair of series connected Zener diodes 40 and 41, reverse-biased through a current limiting resistor 42. Limiting resistor 42 is selected so that only one of the Zener diodes can be in the reverse breakdown region at any given time. In this manner the diodes act as a transfer switch. One "contact" of the switch goes to A.C. ground through a by-pass capacitor 43. The other "contact" goes to the output transformer 37.

To effect this switching of the output of generator 21, a pair of current by-pass resistances are provided across diodes 40 and 41. These resistances comprise a photocell such as, for example, the light-sensitive diode 44 located in probe 15 and resistor 45.

Resistor 42 is chosen such that with a given voltage source and with the resistances of photocell 44 and resistor 45 in series across diodes 40 and 41, the sum of the voltage drops across the two Zener diodes 40 and 41 is less than that necessary to produce reverse breakdown in both diodes at the same time, but greater than that necessary to produce reverse breakdown in one of the Zener diodes. The resistance of resistor 45 is then chosen such that in conjunction with the photocell 44 it forms a variable voltage divider which is capable of varying the voltage across the two Zener diodes from less than, to greater than, reverse breakdown voltage. More specifically, in the absence of appreciable light, photocell 44 appears as a relatively high impedance across diode 40 whereas resistor 45 appears as a relatively low impedance across diode 41. In this condition, the voltage across diode 40 is large enough to effect reverse breakdown of that diode, thereby shunting the output of generator 21 to ground through capacitor 43. Thus, substantially no calling line-identifying signal is applied to the output transformer 37. However, as the attendant scans the appropriate row and reaches a lighted call lamp, the impedance of photocell 44 drops, reducing the voltage across diode 40. Correspondingly, the voltage across diode 41 increases to greater than that necessary for reverse breakdown thereby permitting a high current to flow through diode 41 (which is located on the output side of switching circuit 23) and consequently signal from generator 21 is transferred to output transformer 37.

Simultaneously, since photocell 44 acts as a current shunt across diode 40, the latter has inadequate current through it to maintain reverse breakdown and ceases to conduct thereby reducing the signal transfer to ground through capacitor 43. The net result is to superimpose the calling line-identifying signal on the row-identifying tone. The attendant, upon hearing the line-identifying signal, then knows that the calling line has been located and the call can be completed.

In a typical switching circuit, the resistance of the photocell 44 may vary from approximately one-tenth the resistance of resistor 45 when light-activated, to ten times the resistance of resistor 45 when little light is present.

Since the switching circuit 23 has a certain amount of inherent leakage, which may cause an audible tone at the output in the absence of a light source, an auxiliary path (not shown), suitably phased to cancel out any spurious signal, can be connected between the generator 21 and the output transformer 37 if required.

It will also be noted that, more generally, switching network 23 has separate utility as a low level switch simply by replacing diode 44 with any other type of variable resistance or by eliminating the current divider (diode 44 and resistor 45) and superimposing a voltage source across diode 41 as a control. Any control voltage operating from above the Zener reverse breakdown point of diode 41 to below it will activate the switching.

In one particular embodiment of the invention, the following components and voltage are used in the row-identifying generators:

V—110 volts
$R_1$—5.62 megohms
$R_2$—3.83 megohms
$R_3$—3.16 megohms
$C_1$–$C_2$–$C_3$—.001 $\mu$f.
$L_1$, $L_2$, and $L_3$ are NE 2 lamps The switching network 23 comprised the following components operating from a −15 volt power supply:

Resistance 42—6,800 ohms
Resistance 45—22,000 ohms
Capacitance 43—4 $\mu$f.
Zener diodes 40 and 41 were 420 A's, and
Photocell 44 was a IN 85 diode In all cases it is understood, however, that the above-described arrangement is illustrative of only one of the many possible spacific embodiments which can represent applications of the principles of the invention. Numerous and varied other arrangements can readily be devised in accordance with these principles by those skilled in the art without departing from the spirit and scope of the invention.

What is claimed is:

1. In a manual telephone switchboard intended to be supervised by a blind attendant,
a plurality of lines terminating at said switchboard arranged in a multiplicity of rows,
an equal multiplicity of audio generators for generating distinctly different tones,
each tone corresponding to a different row on said switchboard,
said generators being responsive to incoming calls on said lines and generating tones indicative of the rows in which the calling lines are located,
and means for coupling said tones to a headset used by said attendant.

2. A telephone switchboard having a plurality of lines terminating thereat and arranged in a multiplicity of rows,
each line having associated therewith a call-light,
an equal multiplicity of row-identifying tone generators for generating distinctly different audio tones, each tone corresponding to a row on said switchboard,
said call-lights and said generators being responsive to incoming calls on said lines,
said generators producing tones indicative of the rows in which the calling lines are located,
means for coupling said tones to a headset, and a light sensitive probe for scanning the call-lights along an indicated row to locate a calling line.

3. A manual telephone switchboard having a plurality of lines terminating at said switchboard arranged in a multiplicity of rows, means for adapting said switchboard for supervision by a blind attendant comprising, an equal multiplicity of audio generators for generating distinctly different tones, each tone corresponding to a row on said switchboard, means responsive to incoming calls on said lines for activating said generators, means for coupling said tones to a headset used by said attendant, means for identifying a calling line in any given row comprising an additional generator and a switch, and a light sensitive probe for closing said switch and coupling the output of said additional generator to said coupling means.

4. The combination according to claim 3 wherein said switch comprises:

a pair of Zener diodes connected in series with a cathode of first of said diodes connected to an anode of a second of said diodes, said connection defining a first common junction, a first by-pass resistance connected between the anode and cathode of said first diode, a second by-pass resistance connected between the anode and cathode of said second diode, a constant voltage source and current limiting resistor connected in series between the anode of said first diode and a second common junction, said current limiting resistor proportioned to permit only one of said diodes at a time to operate in the reverse bias breakdown region, an output load connected between the cathode of said second diode and said second common junction, means for coupling a signal source between said first and said second common junctions, a signal by-pass capacitor connected between the anode of said first diode and said second common junction, and means for reducing the resistance of said first by-pass resistance.

5. The combination according to claim 4 wherein said first by-pass resistance is a photocell, and wherein said means for reducing the resistance of said photocell comprises exposing said photocell to a source of light energy.

References Cited by the Examiner

UNITED STATES PATENTS

| | | | |
|---|---|---|---|
| 2,261,822 | 11/1941 | Arndt | 179—91 |
| 2,673,935 | 3/1954 | Waldhauer | 250—210 |
| 2,965,771 | 12/1960 | Finkel | 307—88.5 |
| 2,994,784 | 8/1961 | White et al. | 250—223 |
| 3,046,418 | 7/1962 | Eachren | 307—88.5 |
| 3,057,965 | 10/1962 | Banks et al. | 179—91 |

ROBERT H. ROSE, *Primary Examiner.*

WILLIAM C. COOPER, *Examiner.*